Feb. 15, 1944.  E. G. BODEN  2,341,900
OIL SEAL
Filed May 14, 1943
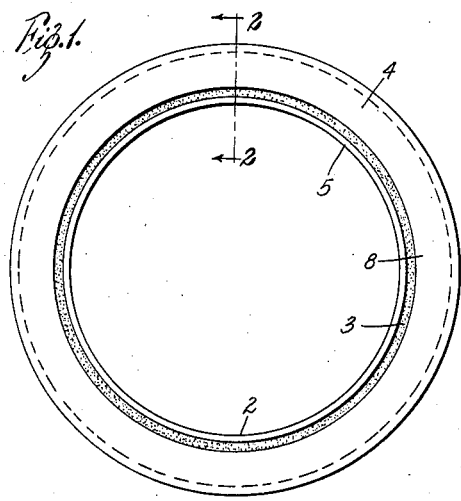
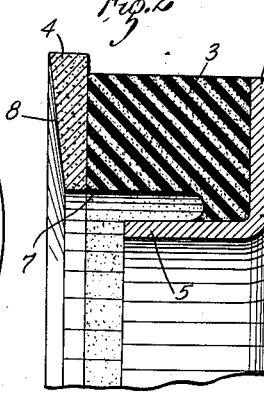
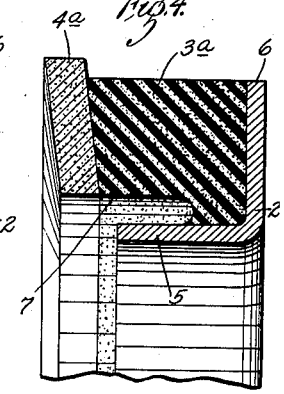
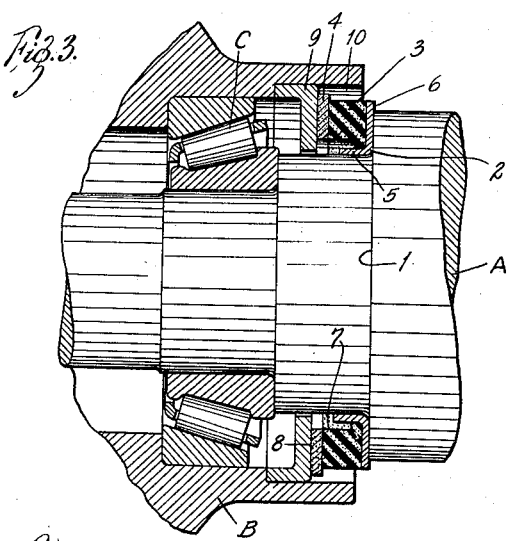
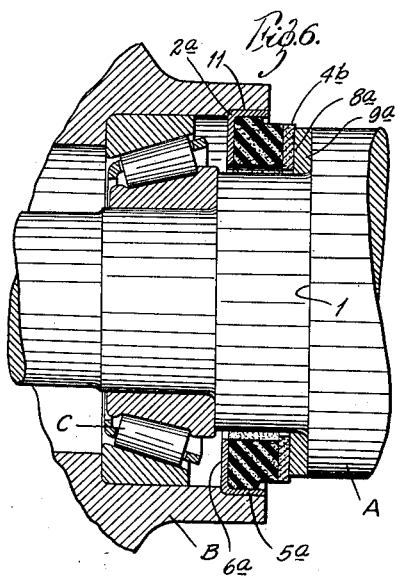
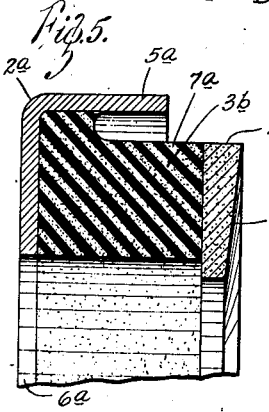
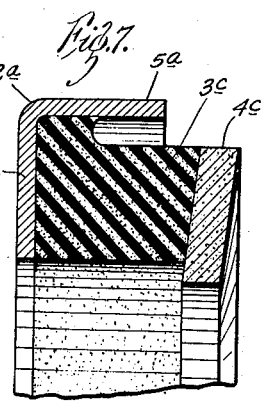
INVENTOR:
Ernest G. Boden,
by Carr Kane & Gravely
HIS ATTORNEYS.

Patented Feb. 15, 1944

2,341,900

UNITED STATES PATENT OFFICE 2,341,900

OIL SEAL

Ernest G. Boden, Canton, Ohio, assignor to The Timken Roller Bearing Company, Canton, Ohio, a corporation of Ohio Application May 14, 1943, Serial No. 486,960

10 Claims. (Cl. 286—7)

This invention relates generally to ring-like devices that are interposed between a shaft and a wheel hub or housing for the purpose of preventing leakage of oil or grease and/or the entry of water, dirt or other foreign matter; and more particularly it relates to self-contained annular sealing devices of the type shown in my Patent No. 2,264,739, wherein a sealing ring is bonded to one end of a sponge rubber ring adapted when compressed axially to press the flat end face of said sealing ring against a flat surface. The principal objects of the present invention are increased sealing efficiency and reduced wear of the sealing face of the sealing ring of the above type of annular sealing device. The invention consists in initially providing the sealing ring of such device with an end sealing face that is disposed at oblique angle to the ring axis and is adapted under endwise pressure to seat flatwise against a flat annular seat with a localized higher unit pressure. The invention also consists in the parts and combinations and arrangements of parts hereinafter described and claimed.

In the accompanying drawing, which forms part of this specification and wherein like symbols refer to like parts wherever they occur, Fig. 1 is an end view of a self-contained annular sealing device embodying my invention, Fig. 2 is an enlarged sectional view on the line 2—2 in Fig. 1, Fig. 3 is a fragmentary longitudinal sectional view, showing said annular sealing device interposed between a shaft and a wheel hub or housing, and mounted on the former, Fig. 4 is a sectional view similar to Fig. 2, through a sealing device of modified form, Fig. 5 is a sectional view of a sealing device adapted for mounting in the wheel hub or housing, Fig. 6 is a view similar to Fig. 3, showing the sealing device of Fig. 5 interposed between the shaft and the wheel hub or housing and mounted in the latter; and Fig. 7 is a sectional view similar to Fig. 5, showing a modification of the sealing ring shown therein.

In the accompanying drawing, my invention is shown embodied in a construction comprising a shaft or axle A, a wheel hub or housing B surrounding said shaft, and a tapered roller bearing C interposed between said shaft and wheel hub.

Entry of water, dirt or other foreign matter into and escape of lubricant from the open end of the wheel hub is prevented by a self-contained annular sealing device mounted on the shaft A between the bearing C and a shoulder 1 on said shaft. Said annular sealing device comprises a mounting or supporting ring 2, a resilient ring 3 and a sealing ring 4, all permanently secured together in end to end relation in the order named for mounting as a complete preassembled unit on the shaft A.

The supporting ring 2 is a metal ring of angular section; that is, said ring comprises a cylindrical sleeve portion 5 with an outstanding radial flange 6 at one end thereof. The resilient ring 3, which is preferably made of synthetic or natural sponge rubber or the like, seats at one end in the angle of the supporting ring 2 and is vulcanized or otherwise bonded or permanently united to the sleeve portion 5 and outstanding radial flange 6 of said supporting ring. The resilient ring 3 terminates beyond the unflanged end of the supporting ring 2 in an unsupported portion 7 that is of larger inside diameter than the outside diameter of the sleeve portion 5 of said supporting ring. Thus, only one end portion of the resilient ring 3 is bonded to the supporting ring 2, thereby increasing the flexibility of said resilient ring.

The sealing ring 4 is made of molded, semi-hard and flexible synthetic rubber or any other pliable and durable smooth surfaced material. As shown in Fig. 2, the exposed end or sealing face 8 of the deformable sealing ring 4 is initially made conical; that is, said sealing face slopes radially inwardly from the outer periphery of said sealing ring to the inner periphery thereof. As shown in Fig. 2, the angular or dished sealing face of the sealing ring 4 is formed by gradually reducing the thickness of said ring from its outer to its inner periphery. In the modified construction shown in Fig. 4, the sealing ring 4a is a dished ring of uniform thickness; and the sealing ring supporting end of the resilient ring 3a is dished to conform to the dished sealing ring.

As shown in Fig. 3, the above described preassembled sealing device is mounted on the shaft A, with the tubular portion 5 of the supporting ring 2 press-fitted on said shaft and with the outstanding radial flange 6 of said ring in endwise abutting relation to the annular abutment or shoulder 1 on said shaft, and with the sealing ring 4 in endwise abutting relation to a friction washer 9 that has a press fit in a counterbore 10 provided therefor in the adjacent end of the wheel hub B. The sealing device is initially long enough that the resilient ring 3 will be compressed endwise when the wheel hub B and the bearing C are in proper position on the shaft A. With the sealing device under such axial compression, the sealing ring 4 and the friction washer 9 are pressed together, the flexibility of the sponge rubber ring 3 permitting the initially conical sealing face 8 of said ring to bear flatwise against the flat sealing face of the friction washer 9. Thus, the angularity of the sealing face 8 of the sealing ring 4 is reduced depending on its compression and said compression is preferably sufficient to cause said sealing face to be disposed in a plane parallel to the sealing face of the washer 9; that is in a plane normal or at right angles to the axis of the sealing device. With the parts in this position, surface contact is maintained between the sealing ring 4 and the washer 9 over the entire area of the annular sealing face 8 of said ring, but the greatest pressure on the seal face is located at the outer periphery thereof due to the greater overall initial length of the sealing device at its outer periphery. Thus, a higher unit pressure is provided at the outer periphery of the sealing device, thereby increasing the sealing efficiency thereof at the point of possible entrance of water, grit or other foreign matter. At the same time, the reduced pressure on the sealing ring 4 from its outer periphery to its inner periphery allows lubricant in the wheel hub B to wipe the cooperating faces of the sealing ring 4 and washer 9 from the inside and thus reduce the seal face wear due to the rubbing action between said cooperating faces.

Figs. 5 and 7 show sealing devices that are adapted for mounting in the wheel hub B. The supporting ring 2a of the sealing device shown in Fig. 5 comprises a cylindrical sleeve portion 5a with an inwardly extending radial end flange 6a. The sponge rubber ring 3b seats at one end in the angle of the supporting ring 2a and is vulcanized or otherwise bonded to the sleeve portion 5a and the inwardly extending radial flange 6a of said supporting ring. The resilient ring 3b terminates beyond the unflanged end of the supporting ring 2a in an end portion 7a of smaller outside diameter than the inside diameter of the sleeve portion 5a of said supporting ring. The sealing ring 4b is vulcanized or bonded to the free end of the resilient ring 3b and tapers in width from its outer to its inner periphery to form the conical sealing face 8a.

As shown in Fig. 6, the supporting ring 2a has a press fit in the counterboard end portion 11 of the wheel hub B; and, when the parts are under sufficient compression, the initially conical sealing face 8a of the sealing ring 4b seats flatwise against the flat face of a friction washer 9a pressed on the shaft A in abutting relation to the annular shoulder 1 thereon. In the modification shown in Fig. 7, the sealing ring 4c is a dished ring of uniform thickness and is vulcanized to the similarly dished end of the end face of the resilient ring 3c. When mounted in the wheel hub after the manner shown in Fig. 6, the sealing device of Figs. 5 and 7 operate in the same manner as the sealing device shown in Fig. 3 to increase the pressure between the sealing device and the sealing washer at the outer periphery of said device; that is, at the point of ingress of water, grit or other matter between the cooperating sealing faces of the sealing ring and washer.

While I have described a shaft and wheel hub construction, it is obvious that the invention is applicable to other constructions wherein a shaft or axle projects through a housing, whether the housing member sustains the shaft or vice versa or whether the shaft rotates in the housing or vice versa. The angularly disposed seal face of the sealing ring may slope outwardly, if it is desired to seal from the inside instead of the outside; and the line of highest pressure contact may be located anywhere between the inner and outer peripheries of the sealing ring by varying the shape of the angular sealing face thereof.

What I claim is:

1. An annular sealing device comprising a mounting ring, a resilient ring fixed at one end to said mounting ring, a pliable sealing ring fixed to the other end of said resilient ring and having an initially conical sealing face adapted under axial pressure sufficient to compress said resilient ring to make flat contact with a flat sealing face disposed normal to the axis of said annular sealing device.

2. A sealing device as set forth in claim 1, wherein the sealing ring tapers in thickness from one peripheral edge thereof to the other peripheral edge thereof to form said conical sealing face.

3. A sealing device as set forth in claim 1, wherein the sealing ring tapers in thickness from its outer to its inner periphery to form said conical sealing face.

4. A sealing device as set forth in claim 1, wherein the sealing ring is dished to form said conical sealing face.

5. An annular sealing device comprising a mounting ring, a ring of resilient rubber or the like fixed at one end to said mounting ring, and a sealing ring of flexible rubber or the like fixed to the other end of said resilient rubber ring and having an initially conical sealing face adapted under axial pressure sufficient to compress said resilient rubber ring to contact flatwise with a flat sealing face disposed normal to the axis of said annular sealing device.

6. An annular sealing device comprising a mounting ring, a resilient ring fixed to said mounting ring and projecting beyond one end thereof, a pliable sealing ring fixed to the projecting end of said resilient ring and having an initially conical sealing face adapted under axial pressure sufficient to compress said resilient ring to make flat contact with a flat sealing face disposed normal to the axis of said annular sealing device.

7. An annular sealing device comprising a mounting ring, a resilient ring having the compressible characteristic of sponge rubber bonded to said mounting ring and projecting beyond one end thereof, and a sealing ring of semi-hard flexible rubber bonded to the projecting end of said resilient ring and having an initially conical sealing face adapted, under axial pressure sufficient to compress said resilient ring, to contact flatwise with a flat sealing face disposed normal to the axis of said annular sealing device.

8. An annular sealing device comprising a supporting ring having a sleeve portion with a radial flange at one end thereof forming an angular seat, a resilient rubber sealing ring having one end disposed in said angular seat and permanently bonded to said sleeve and flange and having its other end terminating beyond the corresponding end of said sleeve, and a pliable sealing ring bonded to said other end of said resilient ring and having an initially conical sealing face adapted, under axial pressure sufficient to compress said resilient ring, to contact flatwise with a flat sealing face disposed normal to the axis of said annular sealing device.

9. A sealing device as set forth in claim 8, wherein the radial flange of said supporting ring projects outwardly from the sleeve portion thereof and the inside diameter of said other end of said resilient sleeve is larger than the outside diameter of said sleeve portion of said supporting ring.

10. A sealing device as set forth in claim 8, wherein the radial flange of said supporting ring projects inwardly from the sleeve portion thereof and the outside diameter of said other end of said resilient sleeve is smaller than the inside diameter of said sleeve portion of said supporting ring.

ERNEST G. BODEN.